United States Patent [19]

Bowman

[11] 4,415,779

[45] Nov. 15, 1983

[54] METHODS OF AND APPARATUS FOR TESTING TELEPHONE SUBSCRIBER LOOP TO LOCATE A FAULT RELATIVE TO A REFERENCE POINT

[75] Inventor: Howard C. Bowman, Winston-Salem, N.C.

[73] Assignee: Western Electric Company, Inc., New York, N.Y.

[21] Appl. No.: 274,592

[22] Filed: Jun. 15, 1981

[51] Int. Cl.³ .............................................. H04B 3/46
[52] U.S. Cl. ................................ 179/175.3 F; 324/52
[58] Field of Search ........................... 179/175.3 F, 78; 324/52; 333/236

[56] References Cited

U.S. PATENT DOCUMENTS

| | | | |
|---|---|---|---|
| 3,636,280 | 1/1972 | Wetzel | 179/175.3 |
| 3,892,929 | 7/1975 | Shylo | 179/175.3 R |
| 3,990,764 | 11/1976 | Krymreich | 339/176 M |
| 4,054,759 | 10/1977 | McGrath et al. | 179/175.3 R |
| 4,109,112 | 8/1978 | Denman | 179/81 R |
| 4,148,539 | 4/1979 | Hardesty | 339/99 R |
| 4,215,381 | 7/1980 | Heisinger | 361/124 |

FOREIGN PATENT DOCUMENTS 55-100773 7/1980 Japan .

OTHER PUBLICATIONS

Advertisement of Proctor & Associates; Telephony, Feb. 25, 1980, p. 50.
Advertisement of Melco Labs; Telephony, Mar. 10, 1980.
Advertisement of Tii Industries; Telephone Engineer and Management, Jun. 15, 1979.
Advertisement of Cidcomm; Telephony Aug. 13, 1979, p. 65.

Primary Examiner—Stafford D. Schreyer
Attorney, Agent, or Firm—E. W. Somers

[57] ABSTRACT

Methods and a system of this invention are used to determine whether a fault in a subscriber loop is located between a telephone central office and a reference point or between the reference point and subscriber terminal equipment without opening the loop. Included in the system are two current interrupter networks one of which is connected in series with the tip conductor and one in series with the ring conductor. If a fault exists between the central office and the reference point, the application of a test signal causes a constant current reading on a meter at a test center. On the other hand, if a fault is present in the loop beyond the reference point, an oscillatory current reading appears on the meter. The system also includes a recognizable impedance termination network which is connected between the tip and ring conductors of the subscriber loop to facilitate testing for opens in the tip and ring conductors.

10 Claims, 3 Drawing Figures

METHODS OF AND APPARATUS FOR TESTING TELEPHONE SUBSCRIBER LOOP TO LOCATE A FAULT RELATIVE TO A REFERENCE POINT

TECHNICAL FIELD

This invention relates to methods of and apparatus for testing a telephone subscriber loop and, more particularly, to a system for locating a fault in a subscriber loop with respect to a reference point between a central office and the subscriber's terminal equipment.

BACKGROUND OF THE INVENTION

A telephone loop normally extends from a central office to an interface connection location and then to terminal equipment on a subscriber's premises. The interface connection location which may be referred to as a reference point is usually adjacent to or on the subscriber's premises and may, for example, be in the vicinity of the well-known protector unit. One such protector unit which protects telephone loops from excessive voltages and currents is shown in U.S. Pat. No. 4,215,381 which issued on July 29, 1980 in the name of R. F. Heisinger.

When a fault occurs in the subscriber loop, the fault either exists between the central office and the reference point or between the reference point and the terminal equipment. A fault is any trouble which prevents the successful operation of the subscriber loop. If the trouble exists between the central office and the reference point, a repair can be made without entering the subscriber's premises. On the other hand, it the trouble exists on the subscriber's side of the reference point, it becomes necessary to enter the premises and to test the equipment.

If a determination as to fault location with respect to the reference point could be made, at least one maintenance problem would be overcome. Recent changes in the organization of maintenance activities within several operating companies have established a separation of craft responsibilities for local loop maintenance. Under those changes, a cable repair technician is dispatched to repair loop faults that occur between the central office and the protector unit at the subscriber's premises. On the other hand, if a fault occurs beyond the protector unit, an installer repairperson is functional. If a determination can be made as to whether a fault in the subscriber loop is located between the central office and the reference point or between the reference point and the terminal equipment, then the functionally responsible craftperson can be dispatched.

A determination as to the location of a fault with respect to the reference point is also useful from another standpoint. Recent changes in the telecommunications industry have resulted in the sale of customer premise telephone equipment by a number of suppliers. This equipment is generally purchased in retail outlets and is capable of being connected into wall terminals by means of modular plug-terminated cords. Modular plugs that terminate the cords and modular jacks which are mounted in the wall terminals are well known and are shown for example in U.S. Pat. Nos. 4,148,539 and 3,990,764 which issued on Apr. 10, 1979 and Nov. 9, 1976 in the names of E. C. Hardesty and C. L. Krumreich, respectively.

One problem that arises because of the interconnection of equipment, which may be manufactured by various concerns, into transmission circuits which are owned and operated by telephone operating companies relates to maintenance. The operating companies are not responsible for repairing equipment which is not owned or sold by them. Should a fault occur between the central office and a particular subscriber's station equipment, a determination must be made as to its location. Otherwise, the operating company would have to resort to the inefficient procedure of dispatching a craftperson to the subscriber's premises not knowing if the fault be there or outside the premises in the loop to which that equipment is connected. If such a determination could be made soon after an outage is reported, both the operating company and the subscriber would benefit. An appropriate telephone operating company craftperson could be dispatched to the premises if the fault is on the company side of a reference point, or the subscriber could be timely advised to seek repair help elsewhere if the fault is on the subscriber side of the reference point.

This latter determination is complicated by the fact that at least, for the majority of subscribers, wiring from the protector to the terminal equipment is owned by the telephone company. In order to locate a fault with respect to the point of demarcation between subscriber equipment and telephone company owned equipment, additional tests may be required or additional apparatus must be located adjacent to the terminal equipment itself. Of course, if in the future the subscriber were to install and own the inside wiring, the point of demarcation becomes the reference point, desirably on the outside of the subscriber's premises.

In one prior art method for overcoming one of the aforementioned problems, a test is made by mechanically disconnecting the loop at the subscriber's premises and by connecting the loop to a termination network of known impedance. The known impedance will be measured in response to a test signal if no fault lies between the reference point and the central office. If the fault lies between the central office and the reference point, the known impedance will not be detected. It follows that in the former case, repairs are needed between the reference point and the terminal equipment while in the latter, they are required between the central office and the reference point. While this method offers a solution to the one problem, its reliability, which depends on making connections through relay contacts, is a problem. Also, there is the necessity of maintaining records to determine whether a particular loop is equipped for such a test. See U.S. Pat. No. 4,109,112.

The prior art for the testing of subscriber loop serviceability also includes U.S. Pat. No. 4,054,759. In response to a predetermined voltage being maintained on the subscriber loop, an oscillator replaces terminal equipment in a subscriber loop through the operation of relay contacts. The characteristic of the loop current as determined by the tone detector at the central office is an indication of the serviceability of the subscriber loop.

While devices for solving at least one of the hereinbefore described problems are available in the marketplace, they do not appear to have the reliability desired for telephone communications and they are too expensive for the widespread use needed in today's industry. What is needed is a highly reliable, inexpensive device which is easily installed adjacent to a subscriber's premises and which is effective to facilitate the rapid servicing of telephone system faults.

SUMMARY OF THE INVENTION

The foregoing problems of the prior art have been overcome by the methods and apparatus of this invention. Loop serviceability is determined by a test system which includes existing test equipment in combination with a relatively inexpensive device which is installed adjacent to a reference point. The reference point is the line of demarcation between telephone operating company crafts and in the future may be that which demarcates between the telephone network and subscriber premises equipment.

The apparatus includes a maintenance termination unit which is connected in series with a tip conductor and with a ring conductor of a subscriber loop and is transparent during the normal operation of the loop. In a test mode, a relatively high voltage and a continuous unidirectional test current are applied to the loop which is equipped with measuring means. Switching facilities are provided for connecting the measuring means to test for a fault between the tip conductor and ground, between the ring conductor and ground, and between the tip and the ring conductors.

During the test, if a reported fault is on the central office side of a point of demarcation, which is in the vicinity of the subscriber's premises, the current flows through the line to the fault and the measuring means indicates a substantially constant current which reflects a resistance path to ground. On the other hand, if the fault is on the subscriber's premises side of the point of demarcation, sufficient current flows to enable a normally disabled current interrupter network which in a preferred embodiment is a distributed relaxation oscillator that draws a pulsating current from the applied power source. As a result of this condition, the measuring means indicates an oscillatory current value.

BRIEF DESCRIPTION OF THE DRAWINGS

Other features of the present invention will be more readily understood in the following detailed description of specific embodiments thereof when read in conjunction with the accompanying drawings in which.

DETAILED DESCRIPTION

Figure 1:
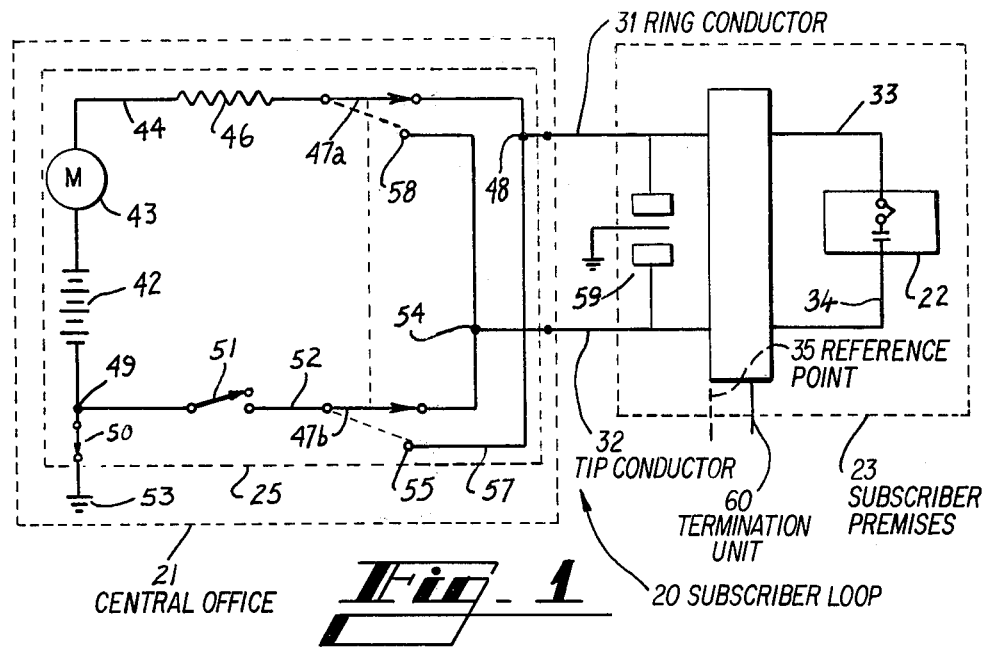
FIG. 1 is an overall schematic view of a telephone subscriber loop which includes a central office, subscriber premise terminal equipment, and a maintenance termination unit of this invention which is adjacent to a reference point between the equipment and the central office.

Referring now to FIG. 1 there is shown a schematic view of a system for testing a telephone subscriber loop, designated generally by the numeral 20. The subscriber loop 20 connects a switching facility 21 which is generally called a central office, to terminal equipment such as a telephone 22 on a subscriber's premises 23. A loop testing apparatus 25 is located at the central office 21 or at a test center which may be remote from but connected to the central office.

The telephone 22 is connected by a modular plug-terminated cord to a jack in a wall terminal. The modular plug and jack are well known and are shown for example in priorly-identified U.S. Pat. Nos. 4,148,539 and 3,990,764.

As can been seen in FIG. 1, the switching facility 21 is connected along tip and ring conductors 31 and 32 respectively, to a reference point 35 while the telephone 22 is connected thereto by lines 33 and 34. Typically the conductors 31 and 32 are included in multi-pair insulated conductor underground and overhead cables with service cables or drop wires run underground or overhead to the reference point 35. The lines 33 and 34 generally include a relatively small number of individually insulated conductor pairs enclosed in a plastic jacket.

The loop testing apparatus 25 includes a test desk having a power source 42 connected through a current meter 43 and along a line 44, through a current limiting resistor 46 and a multi-pole, multi-position switch 47 which reverses the connection of the tip and the ring conductors 32 and 31 to the test apparatus. In a normal mode, the test apparatus including the meter 43 is connected through the switch 47a to a junction 48 at the ring side of the loop 20, and in a reverse mode is connected through a contact 58 to a junction point 54 at the tip side of the loop. The junction point 48 is also connected to a contact 55 which is adapted to be the connection point for the ring conductor 31 with ground through the switch 47 in a reverse mode and the switch 51. A negative terminal of the voltage source 42 is connected through a junction point 49 through a ground key 50 to ground 53 and to a switch 51. The switch 51 is connected through a line 52 through the switch 47, the contact 55 and a junction point 54 of a tip side of the loop 20, and in the reverse mode of the switch 47 through the contact 55 that is connected along a line 57 to the junction point 48. This arrangement is adapted to cause a direct current (DC) to be applied through the resistor 46 in series with the meter 43 that is capable of indicating a fault current.

A maintenance termination unit, which is hereinafter designated MTU and by the numeral 60, is used to determine whether a fault in the subscriber loop 20 is located between the central office 21 and the MTU or between the MTU and the terminal equipment. The MTU 60 is connected in series with the loop 20 at the entrance of the loop to the subscriber's premises 23 adjacent to the reference point 35. Turning again to FIG. 1, the reference point 35 in preferred embodiment includes a familiar protector unit 59 which is generally mounted on an outside wall of the subscriber's premises. The protector unit 59 is connected across the ring conductor 31 and the tip conductor 32. Such a unit is shown, for example in priorly mentioned U.S. Pat. No. 4,215,381.

Figures 2, 3:
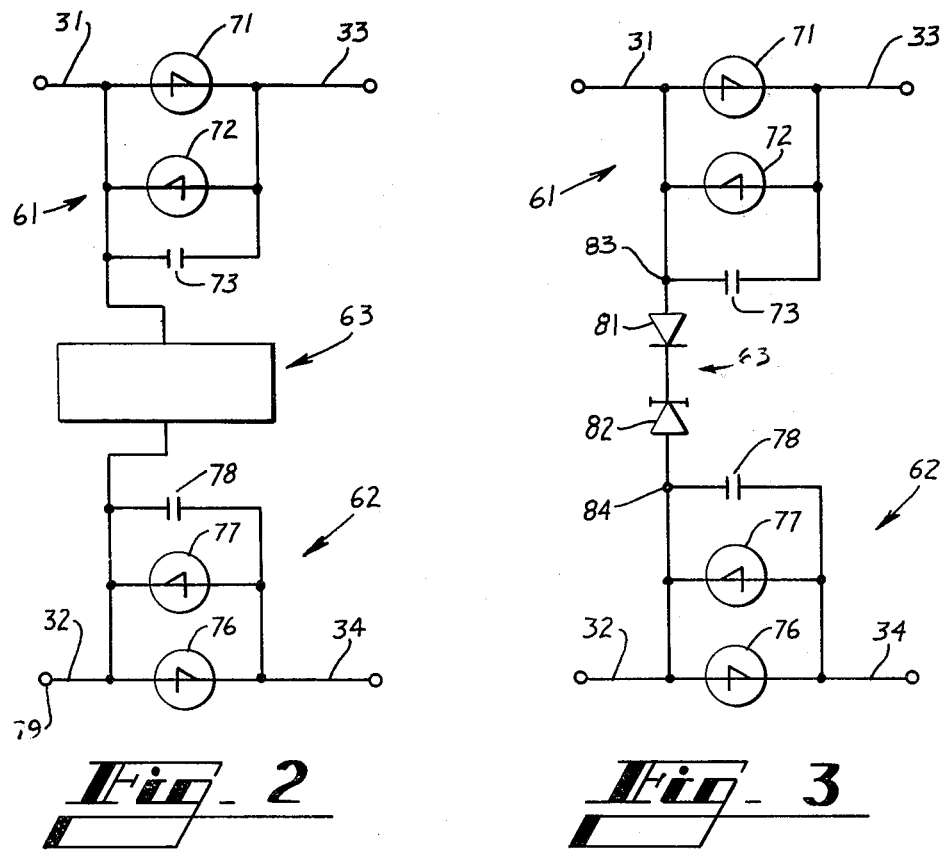
FIG. 2 is a schematic view of the maintenance termination unit of this invention for determining the location of a fault with respect to the reference point, and a recognizable termination for use in determining the location of an open.
FIG. 3 is a schematic view of one embodiment of the recognizable termination of the device of this invention.

Going now to FIG. 2, there is shown a detailed schematic view of the maintenance termination unit 60 of this invention. The MTU 60 includes a current interrupter network which is designated generally by the numeral 61, and which is connected in series with the ring conductor 31. In a preferred embodiment, the current interrupter network is a relaxation oscillator. The MTU 60 also includes a current interrupter network 62 which is connected in series with the tip conductor 32 and an impedance termination network 63 which is connected between the current interrupter networks 61 and 62.

As is best seen in FIG. 2, the current interrupter networks 61 and 62 are substantially identical. The current interrupter network 61 comprises in parallel forward and reverse connected four layer diode switches 71 and 72, which are associated with the ring side of the line, and a capacitor 73. The resistor 46 and the capacitor 73 comprise a charging network having a time constant which is chosen to render the charging current visible on the meter 43. As for the current interrupter network 62 which is associated with the tip side of the line, it includes in parallel forward and reverse connected diode switches 76 and 77 and a capacitor 78.

The diode switches of the current interrupter networks 61 and 62 break down and conduct in response to a direct current signal having a voltage level greater than their threshold voltages. Breakdown and conduction provides a connection between the loop test apparatus 25 and the subscriber's terminal equipment. In order to avoid inadvertent breakdown, the four layer diode switches 71 and 72 are selected so that their threshold voltages are below the value of signals which are commonly present in the subscriber loop. The diode switches 71 and 72 present a high impedance to signals below their threshold values and are thus effective in providing an open subscriber loop. Also, the diodes of the current interrupter networks 61 and 62 are such that their minimum holding currents are higher than the maximum current which is caused to flow through the loop from the test apparatus.

In a preferred embodiment, Shockley diodes are used as the diode switches 71 and 72. Shockley diodes are well known and have characteristics which are described, for example, in THYRISTOR D.A.T.A. Book ® publication as disseminated by D.A.T.A. Inc. of San Diego, Calif. Conduction of a common diode is terminated by a removal of the voltage which has been applied to cause it to assume a conductive state. A Shockley diode is a voltage sensitive switch which is turned on by a predetermined voltage and which can be turned off by allowing the current which is applied thereto to fall below its characteristic holding current. As the applied voltage increases, a relatively high impedance is obtained until breakover voltage is reached. At that point, the diode goes into conduction and the current flow is limited only by the impedance of external means such as the resistor 46 (see FIG. 1). The diode remains in a conductive state until the current drops below a characteristic holding current of the diode. At that time the diode ceases to conduct and returns to a relatively high impedance condition.

As seen in FIG. 2, the portion of the MTU 60 which is associated with the ring side of the loop 20 includes provisions for a normal subscriber talk path. A path for a nominal -48 volt DC talk signal occurs through the diode 72 to the terminal equipment 22 and from the terminal equipment through the diode 76. No path is provided through the diode 71 since it is biased in a manner opposite to that of the diode 72.

The apparatus of this invention is capable of being controlled to perform tests for detecting several kinds of faults. Faults which result in current leakage from the tip conductor 32 to ground, ring conductor 31 to ground or from the tip conductor to the ring conductor may occur because of moisture ingress, the connection of a conductor to ground or when two conductors touch each other. Another kind of fault is called an open or wire break which could occur as a result of a tree falling across a telephone cable or of a subscriber working with framing members in a home.

The operation of the apparatus may be described as follows. In normal operation, when the terminal equipment 22 is on-hook, no current flows and the diodes 72 and 76 are non-conducting thereby disconnecting the terminal equipment from the loop. For a normal off-hook condition, the line voltage exceeds the threshold voltage of the normal talk diode switches 72 and 76 so that they are caused to conduct. Also, in that condition, the current exceeds the holding current of the diode switches 72 and 76 and they are held in a conductive state. As a result, the current interrupter networks 61 and 62 are transparent during the normal operation of the loop 20.

When trouble is reported on an appropriately equipped line, it is transferred to a repair service bureau and is brought up on a local test desk in the central office 21. To test for a ring-to-ground fault, the test signal is applied from ring to ground. With the test key 47 in a normal position to complete a circuit path to the junction point 48, as shown in FIG. 1, and with the ground key 50 closed, a DC test signal is applied. With the source 42 connected to ground 53, the test signal is applied through the resistor 46 in series with the meter 43.

The response of the system to this signal is a function of the loop condition. If no fault is present between the ring conductor 31 and ground, there is insufficient leakage current to ground and the meter 43 reads zero current. If a fault lies on the ring side of the loop 20 between the central office and the protector unit 59 at the subscriber's premises 23, current flows along the line 44 through the resistor 46 and the switch 47 to ground. Current flows from ground 53 through the meter 43 to complete the circuit to give an indication of the magnitude of the fault. In that event, the meter 43 will indicate a steady, substantially constant, DC current which is inversely proportional to the magnitude of the fault impedance. For example, the higher the reading, the lower is the impedance of the fault. Since the resistor 46 and the battery voltage source 42 are connected to ground 53, current can only flow if there is a fault on the outside of the central office 21. If no fault exists, there is no current flow and no current identification at the meter 43.

In the event that a fault is located between the reference point 35 and the terminal equipment 22, a current path is completed through the four layer diode switch 71 of the current interrupter 61. As a result of a defect of this nature, the capacitor 73 is ground referenced through the fault. The capacitor 73 is charged at a rate limited by the resistor 46 and the magnitude of the fault, i.e. the larger the combined resistance of the resistor 46 and the fault, the slower the rate of which the capacitor is charged. Hence, the resistor 46 and the fault determine the rate at which current is stored in the capacitor 73. When the charge on the capacitor 73 becomes sufficiently large to exceed the breakover voltage of the diode 71 of the current interrupter network 61, the diode 71 associated with the capacitor 73 switches in and discharges around the circuit comprising the diode 71 and the capacitor 73. However, because of the current limiting resistor 46, there is insufficient current to maintain the conduction of the diode 71 and it turns off, allowing the capacitor 73 to be recharged. This results in an oscillatory indication at the meter 43. The charging period for the capacitor 73 and the frequency of the oscillation are a function of the magnitude of the fault impedance.

Simply stated, if a fault is located on the central office side of the reference point 35, a DC current flow is obtained which will not charge the capacitor 73. Only when the fault lies on the subscriber side of the reference point 35 will the capacitor 73 or the capacitor 78 be charged.

To test for a tip-to-ground fault, the procedure is essentially the same with the exception that the switch 47 of FIG. 1 is switched to its reverse position with the key 47a switched to engage the contact 58. Fault indications are identical to those described for the ring-to-ground test.

The circuit testing for a tip-to-ground fault on the subscriber side of the reference point 35 is identical to that for testing for a ring-to-ground fault with the diodes 76, 77 and the capacitor 78 of the current interrupter network 62 performing equivalent functions. However, in this portion of the loop 20, the diode 77 is not required, as is the diode 72, to provide a normal talk path as long as the tip portion of the loop 20 is connected to a junction point 79 (see FIG. 2). Because of its bias, the diode 76 performs for the current interrupter network 62 the functions which both the test diode 71 and the normal talk path diode 72 provide for the current interrupter network 61.

The apparatus 20 is also capable of determining with respect to ground the location of a tip-to-ring fault such as, for example, where the tip and ring conductors are shorted. When the key 51 is closed and the ground key 50 is opened, the current interrupter networks 61 and 62 operate in series to detect the presence of a tip-to-ring fault. As a final step in the test for a fault located between the central office and the reference point 35, a test person places the switch 47 in its reverse position, closes the switch 51, and opens the ground key 50. In the event that a tip-to-ring fault exists between the central office 21 and the protector unit 59, an indication in the form of a substantially constant reading will appear on the meter 43. If a tip-to-ring fault exists between the protector unit 59 and the subscriber terminal equipment 22, an indication in the form of an oscillatory reading will appear on the meter 43.

In the event there is no evidence of a ring-to-ground, a tip-to-ground or a tip-to-ring fault, the system of this invention permits a manual test for opens without the need for a mechanized loop tester. Referring now to FIGS. 1 and 2, the switch 47 is put in its normal mode with key 47a connecting to junction point 48 and the key 51 is closed.

Without more, the system described thus far cannot distinguish between a subscriber loop which is in working order and one in which there is an open. For either condition, there is no current indication. This problem is overcome with the aid of a particular or characteristic signature of the termination unit 60. For this, a recognizable termination in the form of the impedance termination network 63 is used to test for and to determine the location of an open.

A positive going voltage is applied to the recognizable termination 63 (see FIG. 2) from the junction point 48. If there is a meter indication of current flow at a predetermined voltage level, the switch 47 is moved to its reverse mode and a positive going voltage applied from the junction point 54 along the tip side of the loop 20. If there is no current indication in this mode, the presence of the MTU 60 has been verified and no open exists between the central office 21 and the MTU. One of the advantages of the system of this invention is that tests may be conducted from the central office to determine if a premise is equipped with a maintenance termination unit. This eliminates the need for records.

In the preferred embodiment of this invention, the recognizable termination includes a diode 81 (see FIG. 3) which is connected in series with a Zener diode 82 between junction 83 and 84 of the current interrupter networks 61 and 62 respectively. The diode 81 conducts only for a positive going signal in a direction from the ring conductor 31 to the tip conductor 32. Because of its function in the recognizeable termination, the diode 81 is referred to as a steering diode. As is well-known, the Zener diode 82 always conducts in one direction. It conducts in a reverse direction, in this network from the ring conductor 31 to the tip conductor 32, in a so-called avalanche mode of insubstantial resistance to conduction when a known voltage is applied. The properties of the diodes 81 and 82 are such that the impedance termination network is balanced between the loop conductors 31 and 32 and ground to avoid noise. The recognizable termination 70 provides a unique signature in the form of impedance in response to current signals of different polarity.

In the embodiment of a recognizable termination shown in FIG. 3, it will be recalled that the steering diode 81 is connected in series with a well-known Zener diode 82. With switches in their normal mode and the key 51 closed, a positive going voltage is applied to a junction point 83. Current flows through the steering diode 81 because of its polarity. The current exceeds the threshold voltage of the Zener diode 82 and flows through to cause an indication on the meter 43. In order to insure that this reading is indicative of an open, the polarity of the voltage is reversed by throwing the switch 47 to engage contacts 58 and 54 to cause the current to flow in an opposite direction. However, because the diode 81 is such that current of only one voltage polarity flows through it, current does not flow in an opposite direction through the diode 81 and the meter 43 shows no reading.

This indicates to the test-person that a recognizable termination is being seen, in this case a DC recognizable termination, and that no open exists. Because of the priorly described tests and this test, it can be infered that the open lies on the subscriber side of the MTU 60.

While the location of a maintenance termination unit adjacent to the subscriber's premises is helpful to the problem of craft separation, additional steps are necessary to determine if a reported fault exists in subscriber-owned terminal equipment. These steps are unnecessary in the event the wiring from the MTU to the terminal equipment is also subscriber-owned.

Under the present arrangement for demarcation between operating company and subscriber-owned terminal equipment, two tests would have to be performed from the test desk at the central office 21 in order to avoid a subscriber premise visit by a telephone craftperson. First, the test is run to determine on which side of the protector unit 59 a fault lies. If the fault lies on the subscriber side, the subscriber is asked to disconnect the terminal equipment 22 from the wall terminal and then a second test is run. If no fault appears, the defect is in the terminal equipment 22; if a fault occurs, the defect lies in the wiring between the protector unit 59 and the wall terminal. Although this arrangement requires two tests, it may offer economies of manufacture and installation because of the combination of the protector unit 59 and the MTU 60.

The use of a double test to avoid craftsperson visits is obviated by locating the test device adjacent the wall terminal. However, this may require special mounting arrangements and a more miniature design than one which is located adjacent to the protector unit 59.

It is to be understood that the above-described arrangements are simply illustrative of the invention. Other arrangements may be devised by those skilled in the art which will embody the principles of the invention and fall within the spirit and scope thereof.

What is claimed is:

1. A method of determining whether a fault in a telephone subscriber loop exists between a central office and a reference point or between the reference point and subscriber terminal equipment, said method comprising the steps of:

applying a test voltage signal from a source capable of providing a continuous unidirectional test current in a sequence to a ring conductor of the subscriber loop and ground, to a tip conductor of the subscriber loop and ground, and between the ring and the tip conductors, each of the conductors having in parallel a voltage sensitive device and an associated energy storage device connected in series therewith;

limiting the amplitude of the test current;

connecting a measuring device to the loop to test for a fault current between the ring conductor and ground, between the tip conductor and ground, and between the ring and tip conductors;

detecting a substantially constant current flow from the ring or the tip conductor to ground or from the ring to the tip conductor in response to a fault between the central office and the reference point; and periodically interrupting the current flow seriatim from the central office to ground and between the tip and the ring conductors to provide an oscillatory current reading on the measuring device in response to a fault between the reference point and the terminal equipment, said step of periodically interrupting the current flow being accomplished by charging one of the energy storage devices until an accumulated charge on the energy storage device exceeds a threshold voltage of the associated voltage sensitive device whereupon the voltage sensitive device is rendered conductive and causes the accumulated charge to be dissipated.

2. The method of claim 1, which is also effective to determine that an open occurs between the central office and the reference point or between the reference point and the subscriber terminal equipment, said method including the steps of:

providing a polarity sensitive network between the tip and ring conductors adjacent to the reference point such that a current of a prescribed polarity will flow only in one direction between the ring and tip conductors in the presence of a voltage which exceeds a reference voltage of the polarity sensitive network; and in response to the absence of a fault, the step of applying a test voltage signal to cause a current flow between the ring and the tip conductors to cause a substantially constant current reading at the measuring device in the absence of an open between the central office and the reference point; then reversing the polarity of the applied voltage signal to verify the preceeding current flow from the central office through the loop to the reference point from which it can be inferred that in the presence of an open in the loop and the occurrence of the substantially constant current reading, the open exists between the reference point and the terminal equipment.

3. A subscriber loop test appartus for connection to a tip conductor and a ring conductor of a subscriber loop adjacent to a reference point which is between a central office that is associated with the subscriber loop and a subscriber's terminal equipment, said apparatus comprising:

means including a source capable of providing a continuous unidirectional test current to the loop for applying a test voltage in a sequence to a ring conductor of the subscriber loop and ground, to a tip conductor of the loop and ground, and between the ring and tip conductors;

means for measuring a substantially constant current and for measuring a pulsating current;

means for limiting the amplitude of the test current;

means for connecting said measuring means to test for a fault between the ring conductor and ground, between the tip conductor and ground, or between the tip and ring conductors;

means responsive to a fault between the central office and the reference point for verifying the presence of a substantially constant current which flows through the fault to ground; and current interrupter means connected in series with each of the loop conductors and responsive to a fault between the reference point and subscriber terminal equipment for periodically interrupting the test current without disconnecting the terminal equipment from the loop to provide an oscillatory current reading, said current interrupter means comprising a network including in parallel an energy storage device and voltage sensitive switching means.

4. The apparatus of claim 3, wherein said current interrupter networking includes in parallel an energy storage device and a four layer diode switch which are connected in series with each of the loop conductors such that when test current is applied, a charge is accumulated on said energy storage device until said charge exceeds the threshold voltage of said diode switch whereupon said accumulated charge is dissipated through said diode switch to reinitiate a charge cycle on said energy storage device which results in the oscillatory current reading.

5. The apparatus of claim 3, which also includes a recognizeable termination being connected between the loop conductors and being effective to determine that an open occurs between the central office and the reference point or between the reference point and the subscriber terminal equipment, said termination being connected between the tip and the ring conductors adjacent to the reference point, and wherein said recognizeable termination includes a first diode in series with a second diode, said second diode being a voltage sensitive diode such that it conducts in an avalanche mode in a reverse direction only upon the application of at least a reference voltage.

6. A subscriber loop test apparatus for connection to a tip conductor and a ring conductor of a subscriber loop adjacent to a reference point which is remote from a central office that is associated with the subscriber loop, said apparatus comprising:

means for applying a test voltage from a source, which is capable of providing a continuous unidirectional test current, in a predetermined sequence to a ring conductor of the subscriber loop and ground, to a tip conductor of the loop and ground, and between the ring and tip conductors;

means for measuring a substantially constant current and for measuring a pulsating current;

means for limiting the amplitude of the test current;

means for connecting said measuring means to test for a fault between the ring conductor and ground, between the tip conductor and ground, or between the tip and ring conductors;

means responsive to a fault between the central office and the reference point for verifying the presence of a substantially constant current which flows through the fault to ground; and current interrupter means including a diode switch which is connected in series with each of the loop conductors to connect the subscriber terminal equipment to the central office as required and responsive to a fault between the reference point and subscriber terminal equipment for periodically interrupting the test current to provide an oscillatory current reading.

7. A system for testing a telephone subscriber loop to determine the location of a fault in the loop with respect to a reference point between a central office and a subscriber's terminal equipment, said system including:

a test apparatus which includes means for measuring current;

subscriber terminal equipment;

loop means for connecting said test apparatus to said subscriber terminal equipment, said means including a tip conductor and a ring conductor;

means including a source capable of providing a continuous unidirectional test current to the loop for applying in a sequence a test voltage signal to a ring conductor of the subscriber loop and ground, to a tip conductor and ground, and between the ring and tip conductors;

means for limiting the amplitude of the test current;

means for connecting said test apparatus to test for a fault between the ring conductor and ground, between the tip conductor and ground, or between the tip and the ring conductors;

means responsive to a fault between the central office and the reference point for verifying the presence of a substantially constant current which flows through the fault to ground and which is detected by said test apparatus; and means responsive to a fault between the reference point and subscriber terminal equipment for periodically interrupting the test current to provide a pulsating current and cause said means for measuring current to display an oscillatory reading, said means for periodically interrupting the test current comprising a current interrupter network which includes in parallel an energy storage device and voltage sensitive means and which is connected in series with each of the loop conductors.

8. The apparatus of claim 7, wherein said current interrupter network includes an energy storage device and a voltage sensitive diode switch which are connected such that when test current is applied, a charge is accumulated on said energy storage device until said charge exceeds the threshold voltage of said diode switch whereupon said accumulated charge is dissipated through said diode switch to reinitiate a charge cycle on said energy storage device which results in the oscillatory current indication.

9. A device adapted to be connected to a tip conductor and to a ring conductor of a subscriber loop adjacent to a reference point remote from a central office that is associated with the subscriber loop, the central office being associated with a test center which is capable of applying a test voltage to provide a unidirectional test current of limited amplitude in the loop and of measuring a substantially constant and a pulsating current, the test center including facilities responsive to a fault between the central office and the reference point for verifying the presence of a substantially constant current which flows through the fault to ground, said device comprising current interrupter means connected in series with each of the tip and the ring conductors for providing a communications path between the central office and subscriber terminal equipment adjacent to the reference point and responsive to a fault between the reference point and the subscriber terminal equipment for periodically interrupting the test current without disconnecting the terminal equipment from the loop to cause an oscillatory current reading, said means including an energy storage device and bidirectional voltage sensitive switching means which are connected such that when the test current is applied, an electrical charge is accumulated on said energy storage device until the accumulated charge exceeds a threshold voltage of said switching means whereupon the accumulated charge is dissipated through said switching means to reinitiate a charge accumulation cycle on said energy storage device which results in a pulsating current indication.

10. The apparatus of claim 9, wherein said current interrupter means includes a current interrupter network and said voltage sensitive switching means includes diode switching means which is effective to connect the subscriber terminal equipment to the central office as required.

* * * * *